United States Patent Office 3,052,687
Patented Sept. 4, 1962

3,052,687
PROCESS FOR THE PRODUCTION OF 2-AMINO-OXAZOLES
Viktor Wolf, Hamburg, Hochkamp, and Werner Loop, Hamburg, Lockstedt, Germany, assignors to Nordmark-Werke Gesellschaft mit beschränkter Haftung
No Drawing. Filed Jan. 13, 1961, Ser. No. 82,380
Claims priority, application Germany Feb. 1, 1960
3 Claims. (Cl. 260—307)

Our invention relates to a process for the production of 2-amino-oxazoles which are valuable intermediate products for the production of bacteriostatic agents.

We have found that 2-amino-oxazoles can be obtained in a technically simple manner and with a surprisingly good yield if a member of the group consisting of cyanamide, the mono-algali metal, di-alkali metal and alkaline earth metal salts of cyanamide is reacted with a compound of the general Formula I

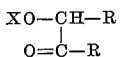

wherein one R represents a member of the group consisting of the alkyl radicals, the hydroxy-alkyl radicals, the benzyl radical and the phenyl radical, the other R is a member of the group consisting of hydrogen, the alkyl radicals, the hydroxy-alkyl radicals, the benzyl radical and the phenyl radical and X represents an acyl radical.

In this way the 2-amino-oxazoles of the general Formula II are obtained

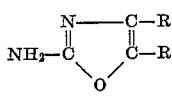

wherein the two R's have the same meaning as in Formula I.

According to a preferred embodiment of our invention the compounds of the general Formula III are used as starting materials

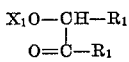

wherein each of the two $R_1$'s represents a member of the group consisting of the alkyl radicals containing 1–3 carbon atoms and the phenyl radical and $X_1$ stands for the radical of a fatty acid containing 1–3 carbon atoms in its molecule.

The reaction is preferably carried out in the presence of a reaction medium of the group consisting of water, the organic solvents which are miscible with water and the mixtures of water and such a solvent. The reaction may be carried out at an acid, alkaline or neutral pH value. The reactants are preferably used in the molar ratio of 1:1; the desired final products are however also obtainable when using one starting material in excess. The reaction may be carried out at medium temperatures, for instance between 0 and 100° C.; but it is preferred to effect the reaction at 20–80° C.

The 2-amino-4,5-dimethyl-oxazole which is an intermediate product for the preparation of 2-(p-acylamino- and p-amino-benzene-sulphonyl)-amino-4,5-dimethyl-oxazoles can be easily obtained by the process of our invention. In this case an acyl ester of acetoin is used as starting material. Preferably such acyl esters of acetoin are used which are derived from fatty acids containing 1–3 C-atoms in their molecule. For economical reasons acetoin acetate is preferred as starting material.

Working up is effected by conventional methods. In view of the instability of some of the 2-amino-oxazoles thus obtained, it is advisable to isolate the 2-amino-oxazoles in such cases in the form of their stable salts with acids.

The following example illustrates the process of the present invention:

Example 13.0 g. of acetoin acetate, 4.2 g. of cyanamide and 25 cc. of water are heated at pH 6–7 for 24 hours to 25° C. Thereafter, 50 cc. of 50% sodium hydroxide solution are added to the reaction mixture while cooling with ice. The mixture thus obtained is completely extracted with methylene chloride. The methylene chloride solution is washed with some water, dried with magnesium sulphate and concentrated to about ⅓ of its volume. Upon introducing dry hydrogen chloride, the hydrochloride of 2-amino-4,5-dimethyl-oxazole is precipitated. This can be purified by recrystallisation from ethanol and then melts between 255 and 258° C. with decomposition.

The picrate obtained from an aqueous solution has after recrystallisation from water a melting point between 216 and 219° C. with decomposition.

What we claim is:
1. A process which comprises reacting a member of the group consisting of cyanamide, the mono-alkali metal, the di-alkali metal and the alkaline earth metal salts of cyanamide with a compound of the Formula I

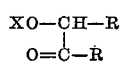

wherein one R is a member selected from the group consisting of alkyl with 1 to 3 carbon atoms and phenyl, the other R is a member selected from the group consisting of hydrogen, alkyl with 1 to 3 carbon atoms and phenyl and X represents an acyl radical of a lower fatty acid, and isolating the 2-amino-oxazole thus obtained.

2. A process as claimed in claim 1 wherein the reaction is carried out in the presence of water at a temperature between 20 and 80° C.

3. A process as claimed in claim 1 wherein a lower fatty acid ester of acetoin is reacted.

References Cited in the file of this patent
UNITED STATES PATENTS
2,186,894    Broderson et al. _____ Jan. 9, 1940

OTHER REFERENCES
Fromm et al.: Leibigs' Ann., vol. 442, page 130 (1925).
Fromm et al.: Liebigs' Ann., vol. 47, page 259 (1926).
Elderfield: "Heterocyclic Comp'ds," vol. 5, page 385 (1957).
Goldberg et al.: Chem. Abstracts, vol. 53, column 16953 (1959).